April 29, 1969 W. FLIEG 3,441,944

PORTABLE PRINT PUNCH

Filed Nov. 2, 1967 Sheet 1 of 2

INVENTOR.
WERNER FLIEG
BY
Roberts & Cohen
ATTORNEYS

INVENTOR.
WERNER FLIEG
BY
Roberts & Cohen
ATTORNEYS

United States Patent Office 3,441,944
Patented Apr. 29, 1969

3,441,944
PORTABLE PRINT PUNCH

Werner Flieg, Newton Center, Mass., assignor, by mesne assignments, to Digitronics Corporation, Albertson, N.Y., a corporation of Delaware Filed Nov. 2, 1967, Ser. No. 680,133
Int. Cl. G01d 9/10
U.S. Cl. 346—66 9 Claims

ABSTRACT OF THE DISCLOSURE

Portable print punch having a dial controllably rotating a disc having elements thereon cooperating with punch pins and at the same time rotating a print wheel such that a punching operation is effected on one paper tape while a printing operation is effected on a second paper tape. The disc is displaced against the punch pins by means of a link actuated by a solenoid. The tapes are stepped by a solenoid transporting mechanism and a rechargeable battery is employed to actuate the solenoids.

*Drawing*

*Detailed description*

Figures 1, 3, 4:
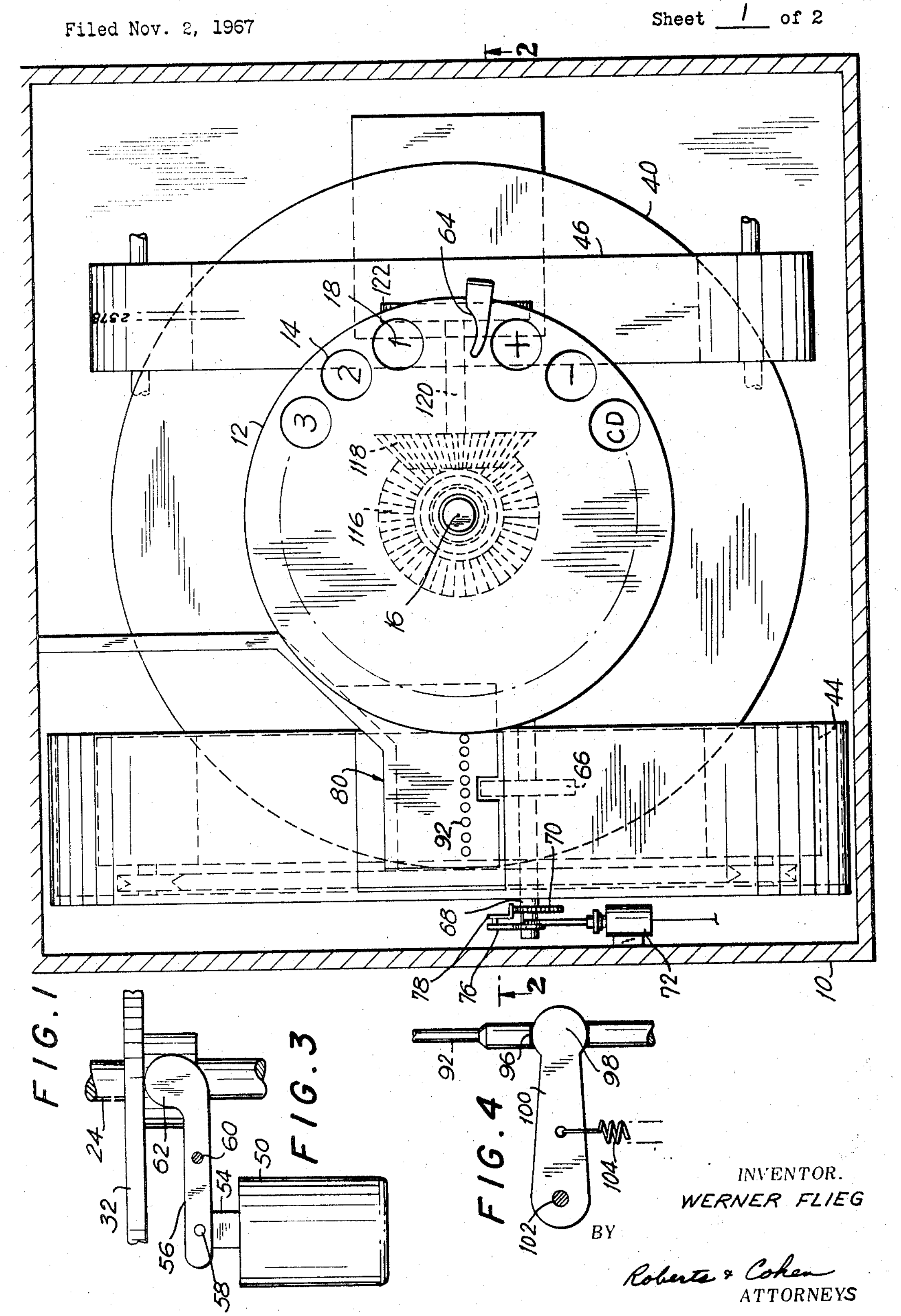
FIGURE 1 is a diagrammatic top view of a portable print punch in accordance with the invention.
FIGURE 3 is a side view, on enlarged scale, of a detail of FIG. 2 illustrating the means by which the disc of FIG. 2 is displaced.
FIGURE 4 is a detail, on enlarged scale, related to the punching pins.

This invention relates to data recording apparatus and more particularly to a portable print punch.

It is an object of the invention to provide improved data recording apparatus.

Another object of the invention is to provide a lightweight portable data recording apparatus in which a plurality of data recording functions can be effected.

Another object of the invention is to provide an improved portable print punch.

Yet another object of the invention is to provide an improved data recording apparatus having an extremely convenient means of figure entries.

Still another object of the invention is to provide a data recording apparatus having an extremely simple mode of operation.

Yet another object of the invention is to provide an improved portable data recording apparatus which can be readily employed in the field such as in connection with civil engineering, inventory control or any other data collection requirement.

Another object of the invention is to provide a data recording apparatus which is extremely reliable in operation.

Yet another object of the invention is to provide an improved data recording apparatus which is extremely economical to manufacture and to maintain.

In achieving the above and other objects of the invention, there is proposed a data recording apparatus including a data storage means having therein a data storage medium such as a paper tape. A data selection means is provided which includes a plurality of data elements selectively registrable with the aforesaid medium for recording respective datum thereon. According to a feature of the invention a dial is provided which is operatively coupled with the selection means and by means of which it is possible to register a selected one of the aforesaid data elements with the medium for the recordal of selected data thereon.

In addition, an actuation mechanism is provided which is responsive to the aforesaid dial to cause the selected element to record the corresponding datum on the data storage medium.

In accordance with a further feature of the invention, the apparatus may comprise a further paper tape and printing means to print on the latter in correspondence with the above noted data elements.

According to another feature of the invention, the apparatus thereof will include a splined shaft connected to and rotated by the dial, the selection means being a disc rotatable with the shaft and axially displaceable thereon.

According to still another feature of the invention, a source of electric power is provided in the form of a rechargeable battery, or any other source of electrical power such as rectified AC or the DC solenoid actuator can be replaced with an AC solenoid and operated directly from an AC line.

In accordance with still a further feature of the invention, solenoids are employed, both for stepping the recording medium as will be shown in detail hereinafter, and for the displacement of the selection disc whereby associated punch pins are actuated.

Yet another feature of the invention relates to the provision of punch pins provided with lateral slots which engage bell cranks which urge the pins to retracted positions.

The above and further objects and features of the invention will become apparent from the following detailed description taken in conjunction with the accompanying drawing, the figures of which have been referred to hereinabove.

Figures 2, 5, 6:
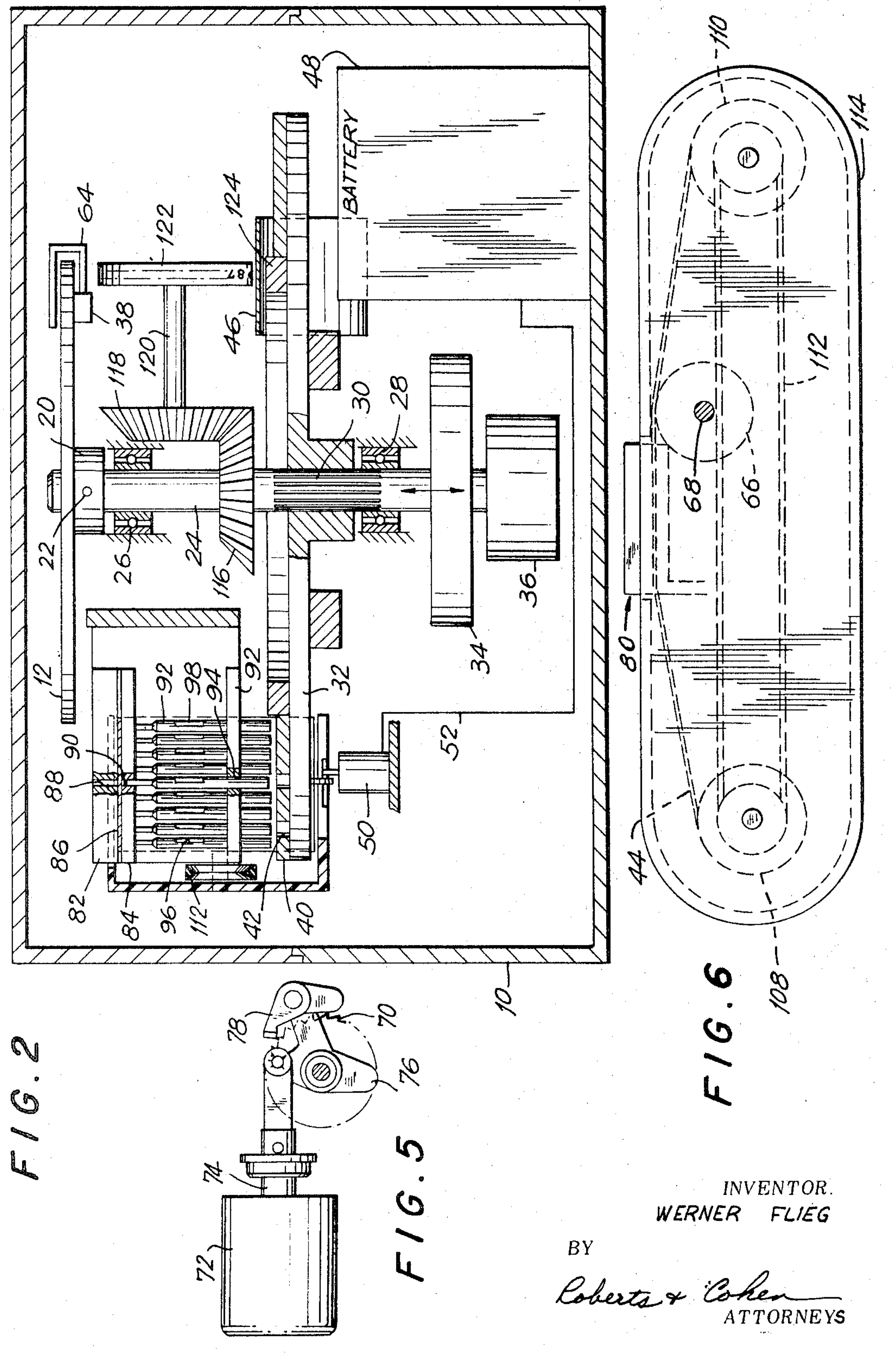
FIGURE 2 is a side view of the apparatus of FIG. 1.
FIGURE 5 is a detail, on enlarged scale, of the tape transporting mechanism.
FIGURE 6 diagrammatically illustrates in side view a tape cartridge employed in the apparatus of the invention.

The portable print punch of the invention is diagrammatically illustrated in FIGS. 1 and 2 in which appears a casing 10 in which is accommodated a dial 12 of the telephone type. The dial 12 is provided with a series of finger holes 14 by means of which the dial can be manipulated for rotation about an axis 16. A disc may be provided below the dial 12 for purposes of displaying indicia such as indicated at 18 and by means of which it is possible to identify the data to be recorded.

The dial 12 is connected by a collar 20 and a pin 22 to a shaft 24. The shaft 24 is supported in bearings 26 and 28 which are fixedly connected to the casing 10. The shaft 24 has a splined portion 30 to which a selector disc 32 is fixed for rotation. Disc 32 is, however, axially displaceable on the shaft 24 due to the provision of the splined portion 30.

A clock-type return spring 34 is connected with the shaft 24 and urges the latter in a predetermined direction of rotation counter to that which is applied to shaft 24 by means of the dial 12. A governor 36 is connected at the lower end of shaft 24 and regulates the speed of rotation of said shaft upon movement of the latter to the home position.

The home position of the dial 12 and therefore of the shaft 24 is controlled by a home position stop 38 which comes into engagement with a home position stop abutment (not shown). The stop 38 is constantly urged into engagement with said abutment by means of the above noted spring 34.

Perpendicularly mounted on the selector disc 32 are a plurality of data elements 40 radially disposed on the disc 32 and each corresponding to one of the finger holes 14. The data elements 40 are provided with coded arrangements of holes 42, the presence or absence of which control the displacement of punching pins as will be described in greater detail hereinunder. Instead of a coded arrangement of holes, a logical "zero" (punch pin *not* actuated), a coded arrangmeent of pins, a logical "one" (punch pin actuated) can be used.

The data recording media of the invention are illustrated in the form of a paper tape 44 and a paper tape 46. The first tape is subjected to a punching operation whereas the second tape is subjected to a corresponding printing operation.

Also provided in accordance with the invention is a rechargeable battery 48. Said battery can, for example, be of the silver-zinc type and such batteries are available which occupy less than 8 cubic inches. This battery in conjunction with the apparatus being described is capable of punching a minimum of 50,000 8-bit characters or 400 feet of paper tape between recharge cycles. The battery can be recharged approximately 200 to 300 times with a shelf life of 1½ years. Various sources of power can be employed in accordance with the invention and in fact the apparatus of the invention may be made selectively AC–DC.

The selector disc 32 requires an axial displacement in order to provide a punch pin displacing action. This axial displacement is provided by means of the solenoid 50 connected by a line 52 to the battery 48. The details of the mechanism arrangement appear in enlarged scale in FIG. 3 wherein it is seen that the solenoid 50 includes an armature 54 connected to a link 56 by means of a pin 58. The link 56 pivots about a pin 60 fixed relative to the casing 10 and includes a nose 62 abutting against the selector disc 32 which is mounted on the shaft 24 as aforesaid. When the solenoid 50 is actuated, the armature 54 is retracted pivoting the link 56 counterclockwise on pin 60 thereby urging nose 62 against disc 32 whereby an axial displacement is imparted to the latter.

The solenoid 50 is connected to a switch in order to be actuated at a predetermined time. This switch includes an actuating lever 64 which is actuated when the finger of the operator has been displaced to the maximum amount desired. In other words, assuming the finger of the operator is inserted in the hole 14 corresponding to the number or datum 3 in FIG. 1 and the dial is then rotated in clockwise direction, the finger of the operator will come to abut against the lever 64 in well-known manner and will actuate the associated switch thereby actuating solenoid 50.

The tape 44 is incrementally stepped by means of a sprocket wheel 66 mounted on a shaft 68, the tape 46 being driven by a similar sprocket wheel (not shown). At one end of the shaft 68 is provided a ratchet wheel 70 which is driven by means of a solenoid 72, the details of this arrangement appearing on enlarged scale in FIG. 5 wherein it is seen that the solenoid 72 includes an armature 74 connected to a three-armed lever 76 which is in turn connected to a pawl 78 which engages with the ratchet 70. Upon actuation of solenoid 72, the armature 74 is retracted pulling the pawl 78 against the ratchet wheel 70 to rotate the wheel and thereby drive the sprocket wheel 66. The tape 44 will accordingly be stepped incrementally upon actuation of the solenoid 72.

The punching mechanism comprises a die 80 including two plates 82 and 84 defining a slot passage 86 through which the tape 44 passes. Die parts 82 and 84 are provided with aligned holes 88 and 90 through which may pass punch pins 92 as the latter is actuated. The pins are, moreover, guided by a further plate 92 provided with holes 94 in which the pins are accommodated.

The pins 92 are provided with lateral openings or slots 96 as is seen in greater detail in FIG. 4. In slots 96 are accommodated heads 98 of bell cranks 100 which are pivoted on pins 102 and are spring-loaded by springs 104 which are connected to the casing 10. In the attitude illustrated in FIG. 4, bell cranks 100 are pivoted under the urging of springs 104 in clockwise direction around pins 102 and therefore urge punch pins 92 in downward or retracted direction. A stop (not shown) limits the retraction of the pins 92 so that they are held in readiness for selective engagement by the data elements 40.

The paper tapes employed in accordance with the invention may be provided in a wide variety of forms. However, it is preferred that tape cartridges be employed such as diagrammatically illustrated in FIG. 6 in the form of cartridge 106. This cartridge includes a supply spool 108 and a takeup spool 110 connected together for common rotation by a belt 112, the entire mechanism being accommodated within a cartridge casing 114. The relationship of a tape 44 to the die 80 is diagrammatically illustrated in FIG. 6.

Preferably a preperforated tape is employed, the sprocket holes of which may be engaged by the sprocket wheel 66. The pins will be provided in sufficient number to accommodate the particular type of code involved. In the illustrated embodiment, 8 pins 92 are indicated so that a code may be constructed on the basis of various combinations as will be available in an 8-bit code.

Finally, before the operation of the apparatus described hereinabove is discussed it should be noted that the solenoid 72 steps the tape 44 and also the tape 46 is preferably actuated after the completion of a punching and printing operation. This is effected by actuating solenoid 72 by means of a switch (not shown) which in turn is actuated by the home position stop 38 or, in other words, when the dial 12 is returned to its home position under the influence of spring 34.

The apparatus of the invention is compact and lightweight and readily utilized. In operation the user will have determined the nature of the data which he seeks to record. He will then insert this data unit by unit into the apparatus of the invention by placing his forefinger into the appropriate holes 14. More particularly, if the operator wishes to insert the digit 3 into the unit he will place his finger in the hole 14 corresponding to the digit 3 and will rotate the dial clockwise until his finger abuts the switch lever 64. Shaft 24 will rotate by a similar amount and will bring the pins 92 the data element 40 having a coded arrangement of holes 42 corresponding to the selected digit. At this time operation of the solenoid 50 under the control of switch lever 44 and by means of power supplied by battery 48 will displace disc 32 axially along the splined portion 30. The selected data element 40 will move towards pin 92 and where the holes 42 are absent will engage against the corresponding pins 92 and will urge the latter axially upwards. Pins 92 will pass into holes 88 and 90 in the die 80 and will cause a punching operation to be effected. The holes punched in the tape 44 will correspond to the coded representation of the selected digit.

On shaft 24 are mounted two bevel gears 116 and 118, the latter of which drives a shaft 120. Mounted on the end of shaft 120 is a print wheel 122 having a periphery constituting print type. The print wheel 122 and a print ring 124 mounted on selector disc 32 sandwich the tape 46 therebetween. Thus when the selector disc 32 is axially displaced the tape 46 is trapped therebetween and a printing operation is effected. This printing operation will be coordinated with the operation of the pins 92 so that the resulting digit printed on paper tape 46 will correspond to the coded representation punched in the tape 44. To effect the specific printing operation an ink charged print wheel of commercially available type may be employed or alternatively ink transfer rollers or ribbons can be employed. In any event, this feature of the invention provides for an immediate and visual check of the data being inserted.

From what has been stated above, it will now appear that the invention provides a data recording apparatus in which a data selection means including a plurality of data elements is operated to bring the elements into selective registration with a data storage medium, this selection being controlled by means of a telephone-type dial which in addition to performing a selection operation actuates a cycle by means of which data recording is effected.

What is claimed is:

1. Data recording apparatus comprising a data storage means including a paper tape constituting a data storage medium, a data selection means including a plurality of data elements selectively registrable with said tape for recording respective datum thereon, a dial operatively coupled with said selection means and operable to register a selected one of said elements with said tape, actuation means responsive to said dial to cause said selected element to record the corresponding datum on said tape, punch means aligned with said tape and actuated by said selected element to perforate said tape thereby to record said corresponding datum thereon, said data storage means comprising a further paper tape, and printing means coupled to said selection means and effective to print on the latter said tape in correspondence with said selected element.

2. Apparatus as claimed in claim 1 comprising a splined shaft connected to and rotated by said dial, said selection means being a disc rotatable with said shaft but axially displaceable on the same, said elements being angularly distributed about said disc, said punch means including punch pins engageable by said elements.

3. Apparatus as claimed in claim 2 comprising a source of electric power; said actuating means including switch means actuated when said dial has been rotated through an angle dependent on the datum selected, a solenoid controlled by said switch means, and a link coupled to said solenoid and adapted to engage said disc and displace the same on said shaft to engage said elements with said punch pins.

4. Apparatus as claimed in claim 3 wherein said elements are provided with coded arrangements of holes in which selected of the punch pins are received to avoid being engaged.

5. Apparatus as claimed in claim 4, wherein said printing means includes a print wheel peripherally opposing said disc, gear means coupling said wheel to said shaft so that said wheel is rotated by an amount corresponding to rotation of said disc, and a print ring on said disc to force the second said tape against the print wheel when said disc is displaced.

6. Apparatus as claimed in claim 5 wherein said source is a rechargeable battery, comprising a further solenoid coupled to said battery and tape drive means coupled to said further solenoid for incrementally driving at least one of said tapes.

7. Apparatus as claimed in claim 6, wherein said punch pins are provided with lateral slots, comprising bell cranks engaged in said slots and springs loading said cranks to urge the pins to retracted positions.

8. Apparatus as claimed in claim 6, comprising a spring means for urging said shaft and dial to a home position and a governor on the shaft to control the speed of the latter under the influence of said spring means.

9. Apparatus as claimed in claim 8, wherein said tape drive means includes a pawl and ratchet means driven by said further solenoid to drive said one tape, said dial being provided with a plurality of finger holes located peripherally therein, said apparatus comprising a fixed disc having indicia thereon to identify said finger holes.

References Cited

UNITED STATES PATENTS

| | | | |
|---|---|---|---|
| 2,699,858 | 1/1955 | Walborn | 197—47 |
| 3,011,615 | 12/1961 | Inoue | 197—6.4 |

RICHARD B. WILKINSON, *Primary Examiner.*

JOSEPH W. HARTARY, *Assistant Examiner.*

U.S. Cl. X.R.

197—1.5, 48; 346—79